(12) United States Patent
Rivera

(10) Patent No.: US 11,427,350 B2
(45) Date of Patent: Aug. 30, 2022

(54) METHODS OF FORMING AND ASSEMBLING A ROTOR BLADE USING ADDITIVE MANUFACTURING PROCESSES

(71) Applicant: Bell Helicopter Textron Inc., Fort Worth, TX (US)

(72) Inventor: Justin A. Rivera, Grapevine, TX (US)

(73) Assignee: Textron Innovations Inc., Providence, RI (US)

( * ) Notice: Subject to any disclaimer, the term of this patent is extended or adjusted under 35 U.S.C. 154(b) by 580 days.

(21) Appl. No.: 16/264,623

(22) Filed: Jan. 31, 2019

(65) Prior Publication Data

US 2020/0247561 A1 Aug. 6, 2020

(51) Int. Cl.
*B64F 5/10* (2017.01)
*B64C 27/473* (2006.01)
(Continued)

(52) U.S. Cl.
CPC ............. *B64F 5/10* (2017.01); *B22F 10/20* (2021.01); *B23K 15/0086* (2013.01);
(Continued)

(58) Field of Classification Search
CPC ........ B64F 5/10; B22F 10/20; B22F 2999/00; B22F 3/1115; B22F 3/1118;
(Continued)

(56) References Cited

U.S. PATENT DOCUMENTS 4,022,546 A * 5/1977 Drees .................... B64C 27/463
416/226
6,054,200 A 4/2000 Woods
(Continued)

FOREIGN PATENT DOCUMENTS

EP 0764764 A1 3/1997
EP 2572979 A1 3/2013
(Continued)

OTHER PUBLICATIONS

Notice of Allowance, dated Jan. 15, 2020, by the USPTO, re U.S. Appl. No. 15/658,928.
(Continued)

*Primary Examiner* — Rebecca Janssen
(74) *Attorney, Agent, or Firm* — Timmer Law Group, PLLC

(57) ABSTRACT

A method of forming a rotor blade, including forming at least one of a partial upper skin, a partial lower skin, and a partial support network using an additive manufacturing process; and forming a first receptacle in at least a one of the partial upper skin, the partial lower skin, and the partial support network using the additive manufacturing process. The first receptacle is configured to receive of at least one of an electronic component and a mechanical component. In some embodiments, there is a method of manufacturing a rotor blade that includes forming a first locating receptacle in at least one of the upper skin, the lower skin, and the support network using the additive manufacturing process; and positioning at least one of the upper skin, the lower skin, and the support network in a desired position on a fixture based, in part, on the first locating receptacle.

13 Claims, 12 Drawing Sheets

(51) Int. Cl.
| | |
|---|---|
| *B33Y 10/00* | (2015.01) |
| *B23K 26/34* | (2014.01) |
| *B29C 64/10* | (2017.01) |
| *B22F 10/20* | (2021.01) |
| *B33Y 80/00* | (2015.01) |
| *B23K 15/00* | (2006.01) |
| *B28B 1/00* | (2006.01) |
| *B23K 26/354* | (2014.01) |

(52) U.S. Cl.
CPC ............ *B23K 26/34* (2013.01); *B23K 26/354* (2015.10); *B28B 1/001* (2013.01); *B29C 64/10* (2017.08); *B33Y 10/00* (2014.12); *B33Y 80/00* (2014.12); *B64C 27/473* (2013.01)

(58) Field of Classification Search
CPC .......... B22F 2207/17; B22F 5/04; B22F 7/08; B64C 27/473; B64C 2027/4736; B64C 2027/4733; B33Y 10/00; B33Y 80/00; B23K 15/0086; B23K 26/34; B23K 26/354; B28B 1/001; B29C 64/10; B29C 70/70; Y02P 10/25; Y02T 50/60; F01D 5/147; F05D 2230/00; B29D 99/0028; B29D 99/0021
See application file for complete search history.

(56) References Cited

U.S. PATENT DOCUMENTS

| | | | |
|---|---|---|---|
| 6,764,280 | B2 | 7/2004 | Sehgal et al. |
| 6,995,334 | B1 | 2/2006 | Kovacevic et al. |
| 7,097,427 | B2 | 8/2006 | Kuhns et al. |
| 7,657,988 | B2 | 2/2010 | Greene |
| 9,129,908 | B2 | 9/2015 | Savic et al. |
| 9,352,421 | B2 | 5/2016 | Illston |
| 9,364,930 | B2 | 6/2016 | Hethcock et al. |
| 9,414,497 | B2 | 8/2016 | Savic |
| 9,429,023 | B2 | 8/2016 | Godfrey et al. |
| 9,579,714 | B1 | 2/2017 | Rutkowski |
| 9,636,229 | B2 | 5/2017 | Lang et al. |
| 10,633,976 | B2 | 4/2020 | Nissen et al. |
| 2011/0054850 | A1 | 3/2011 | Roach |
| 2011/0311389 | A1 | 12/2011 | Ryan et al. |
| 2012/0201686 | A1 | 8/2012 | Fromentin et al. |
| 2013/0071562 | A1 | 3/2013 | Szuromi et al. |
| 2013/0224008 | A1 | 8/2013 | Cheung et al. |
| 2013/0276461 | A1 | 10/2013 | Propheter-Hinckley et al. |
| 2013/0294891 | A1 | 11/2013 | Neuhaeusler et al. |
| 2014/0301856 | A1 | 10/2014 | Oldroyd et al. |
| 2015/0345396 | A1 | 12/2015 | Zelesky et al. |
| 2016/0115822 | A1 | 4/2016 | Cortequisse |
| 2016/0145758 | A1* | 5/2016 | King .................. C25D 1/20 205/117 |
| 2016/0303818 | A1 | 10/2016 | Thiagarajan et al. |
| 2016/0319678 | A1 | 11/2016 | Staroselsky et al. |
| 2017/0101871 | A1 | 4/2017 | Tiedemann et al. |
| 2017/0128184 | A1 | 5/2017 | Sufyan et al. |
| 2017/0204833 | A1 | 7/2017 | Bensely et al. |
| 2017/0217109 | A1 | 8/2017 | Measom et al. |
| 2017/0259329 | A1 | 9/2017 | Felwor |
| 2018/0079482 | A1 | 3/2018 | Ivans et al. |
| 2018/0119614 | A1* | 5/2018 | Scott .................. F02C 7/04 |
| 2019/0032491 | A1 | 1/2019 | Nissen et al. |
| 2019/0193829 | A1* | 6/2019 | Schlueter ............ B22F 7/062 |
| 2020/0114573 | A1* | 4/2020 | TenHouten et al. .... B22F 10/20 |
| 2020/0217206 | A1 | 7/2020 | Nissen et al. |

FOREIGN PATENT DOCUMENTS

| | | |
|---|---|---|
| EP | 2708463 B1 | 6/2015 |
| EP | 2942424 A1 | 11/2015 |
| EP | 3028793 A1 | 6/2016 |
| EP | 3147069 A1 | 3/2017 |
| EP | 3435259 A1 | 1/2019 |
| WO | 2016184685 A1 | 11/2016 |

OTHER PUBLICATIONS

Office Action, dated Jun. 28, 2019, by the USPTO, re U.S. Appl. No. 15/658,928.

EP Exam Report, dated Oct. 21, 2019, by the EPO, re EP Patent App No. 17198169.9.

European Search Report, dated Jul. 16, 2018, by the EPO, re EP Patent Application No. 17198169.9.

European Examination Report, dated Aug. 1, 2018, by the EPO, re EP Patent Application No. 17198169.9.

European Examination Report, dated Feb. 6, 2019, by the EPO, re EP Patent App No. 17198169.9.

Office Action-Restriction, dated Feb. 28, 2019, by the USPTO, re U.S. Appl. No. 15/658,928.

Ji-Hong Zhu et al.; Topology Optimization in Aircraft and Aerospace Structures Design; Archives of Computational Methods in Engineering; vol. 3, No. 4; Apr. 14, 2015; pp. 595-622.

Ozdemir Zuhal et al.; Energy absorption in lattice structures in dynamic: Experiments; International Journal of Impact Engineering; Pergamon, GB; vol. 89; Nov. 17, 2015; pp. 49-61.

Mason; Moving continuous-fiber 3D printing into production; Mar. 1, 2019; https://www.compositesworld.com/blog/post/moving-continuous-fiber-3d-printing-into-production.

EP Exam Report, dated Apr. 22, 2020, by the EPO, re EP Patent App No. 17198169.9.

EP Exam Report, dated Jun. 24, 2021, by the EPO, re EP App No. 17198169.9.

* cited by examiner

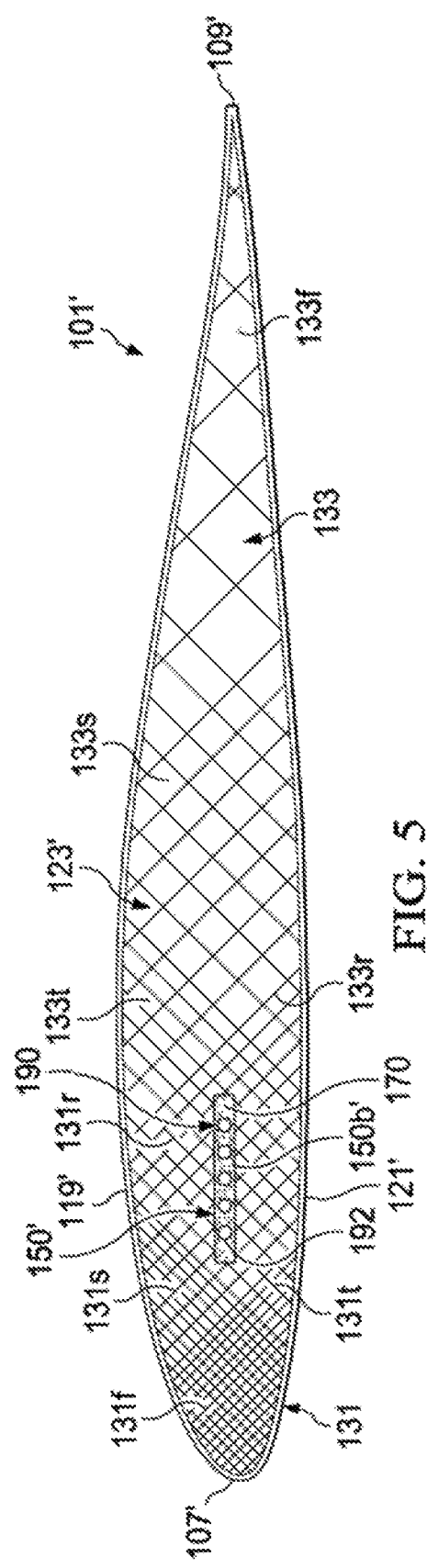

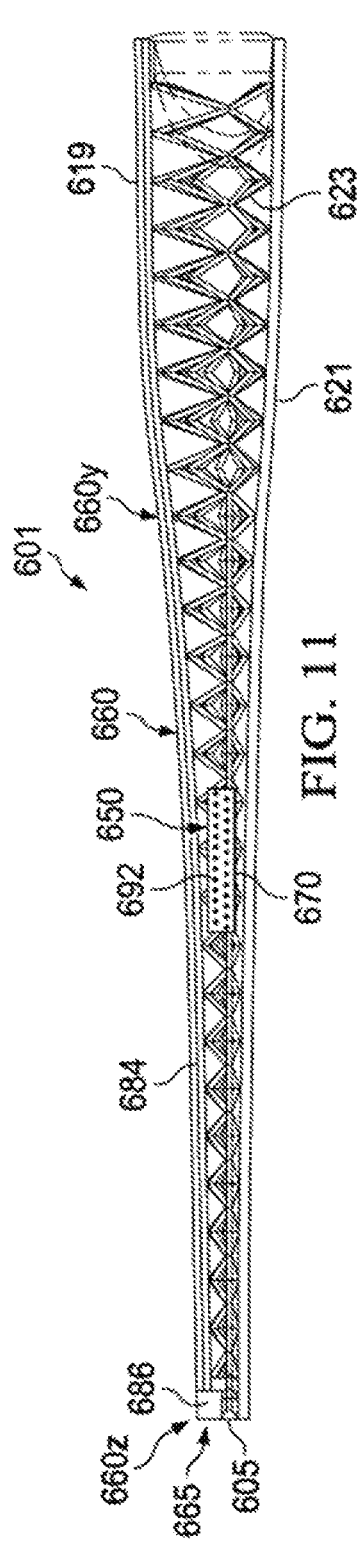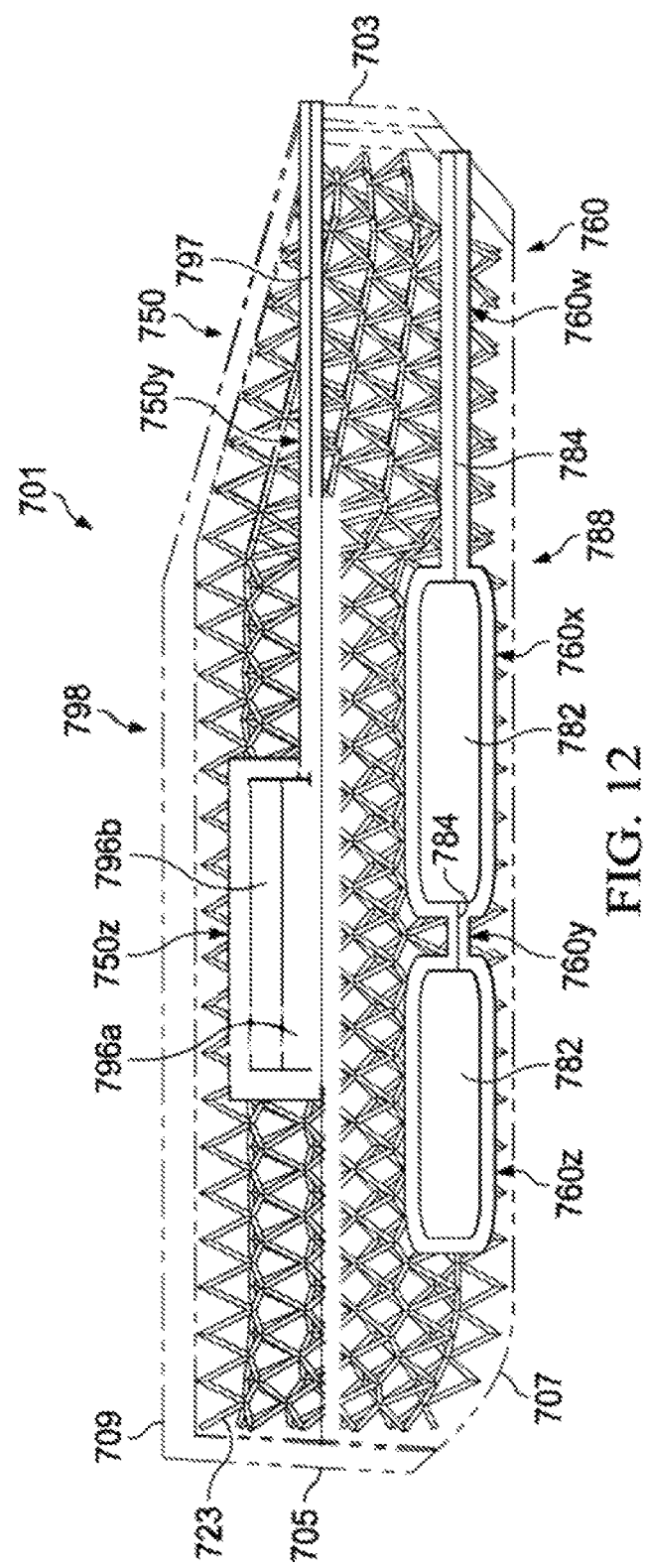

METHODS OF FORMING AND ASSEMBLING A ROTOR BLADE USING ADDITIVE MANUFACTURING PROCESSES

BACKGROUND

Technical Field

The present disclosure relates to an aircraft rotor blade, as well as methods of forming and assembling a rotor blade.

Description of Related Art

Conventional aircraft rotor blades have been manufactured using a time-consuming, multi-step process involving the fabrication of several detail parts that are separately assembled to form the full rotor blade structure. Rotor blades have specific structural and dynamic requirements, which historically has driven manufacturers to separate rotor blade design and manufacture into several detail parts and sub-assemblies. Historically in the aerospace industry, the design and manufacture of multiple detail parts and sub-assemblies provides more control over the process and ensures that the assembled rotor blade meets stringent operational requirements. Oftentimes a designated set of expensive tools in a particular location is needed to manufacture each individual blade parts which can require thousands of feet in shop floor space. With the existing methods of manufacture, it is extremely difficult to produce an entire blade in a few steps due to the variation in movement and physical and chemical changes exhibited by the different polymeric and metallic materials when exposed to changes in pressure and temperature.

Moreover, rotor blades include electrical components and/or mechanical components arranged between the blade root and the blade tip. Such electrical components (e.g., wires, lights, heater elements) and mechanical components (e.g., fasteners, weights, actuators) are typically positioned in between individual blade parts during assembly. In some instances, labor intensive precision machining is necessary for placement of the electrical and/or mechanical components in the rotor blade. In some designs, bolt holes are precision drilled to secure the electrical and/or mechanical components in the rotor blade. Bolt holes need to be closely aligned and the holes must be drilled very precisely in diameter to match the bolt. It is very difficult and expensive to drill precise holes with low tolerances in fiber composite laminates used for conventional rotor blades because the laminates are easily damaged during the drilling process. In addition, the fastening bolts can be subjected to shear loads from the weight of the electrical and/or mechanical component due to the centrifugal force generated by the rotating rotor blades, which causes high stress concentrations on the fastening bolts and can ultimately result in failure of the rotor blade.

There are several additional problems associated with electrical and/or mechanical components in conventional rotor blades. In some designs, the mechanical and/or electrical components can run through the blade to the tip causing the blade to lose stiffness and strength. This can require additional blade parts to make up for the loss of stiffness. Moreover, the assembly and removal of electrical and/or mechanical components can be difficult and labor intensive in conventional rotor blades.

There is a need to improve structural efficiency in a rotor blade, as well as decrease expenses associated with the manufacturing of a rotor blade.

SUMMARY

Description of the Drawings

The novel features believed characteristic of the embodiments of the present disclosure are set forth in the appended claims. However, the embodiments themselves, as well as a preferred mode of use, and further objectives and advantages thereof, will best be understood by reference to the following detailed description when read in conjunction with the accompanying drawings, wherein:

FIGS. 4-5 are cross-sectional views of illustrative embodiments of the rotor blade taken from section lines A-A in FIG. 3A;

FIG. 6 is a schematic cross-sectional view of an illustrative embodiment of a rotor blade, according to an illustrative embodiment;

FIG. 11 is a schematic side view of a rotor blade including a plurality of receptacles according to an exemplary embodiment of a rotor blade;

FIG. 12 is a schematic top view of a rotor blade including a plurality of receptacles; according to an illustrative embodiment;

DESCRIPTION OF THE PREFERRED EMBODIMENT

Illustrative embodiments of methods, apparatuses, and for forming, assembling, and manufacturing a rotor blade using additive manufacturing processes are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the devices, members, apparatuses, etc. described herein may be oriented in any desired direction.

Figure 1A:
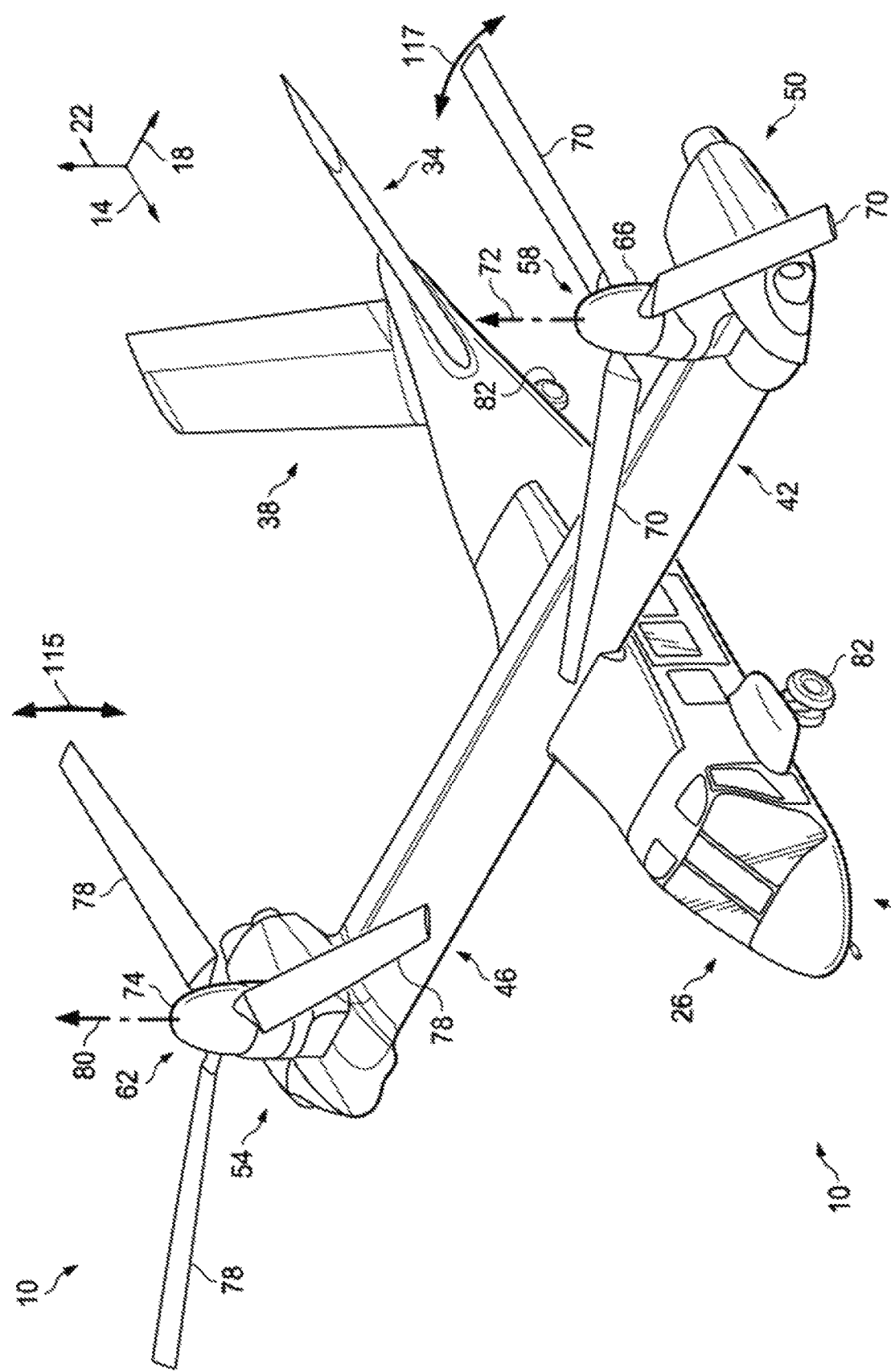
FIG. 1A is a perspective view of an aircraft, according to one example embodiment.
Figure 1B:
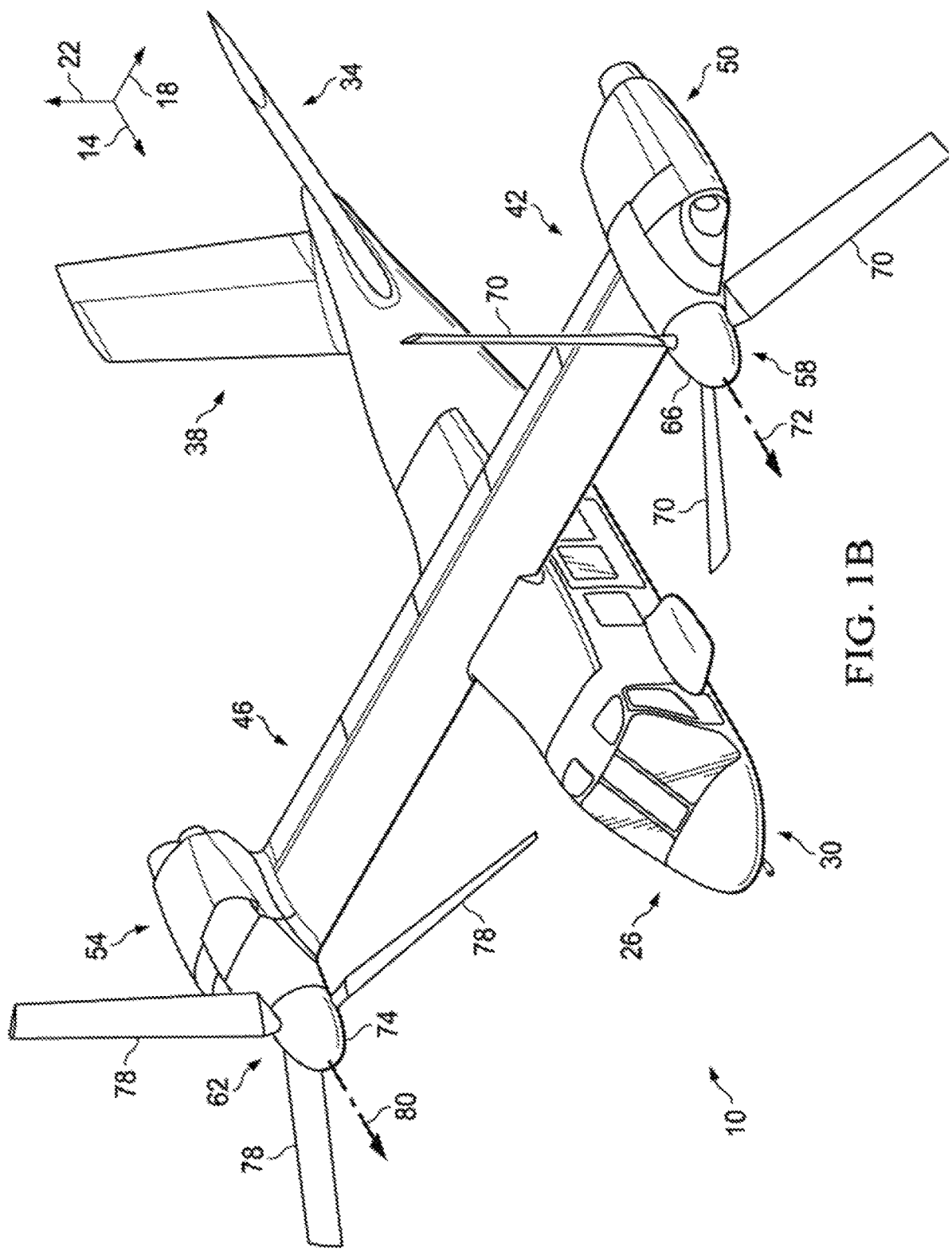
FIG. 1B is another perspective view of the aircraft in FIG. 1A, according to one example embodiment.

FIGS. 1A-1B depict aircraft 10 as a tiltrotor aircraft. FIGS. 1A-1B depict three mutually orthogonal directions X, Y, and Z forming a three-dimensional frame of reference XYZ. Longitudinal axis X 14 corresponds to the roll axis that extends through the center of aircraft 10 in the fore and after directions. Transverse axis Y 18 is perpendicular to longitudinal axis 14 and corresponds to the pitch axis (also known as a control pitch axis or "CPA"). The X-Y plane is considered to be "horizontal." Vertical axis Z 22 is the yaw axis and is oriented perpendicularly with respect to the X-Y plane. The X-Z plane and Y-Z plane are considered to be "vertical."

Aircraft 10 includes fuselage 26 as a central main body. Fuselage 26 extends parallel to longitudinal axis 14 from a fuselage front end 30 to a fuselage rear end 34. Aircraft 10 further includes tail member 38 extending from fuselage rear end 34 of fuselage 26. Aircraft 10 includes wing 42 and wing 46 extending from fuselage 26 substantially parallel to transverse axis Y 18. Wing 42 is coupled to propulsion system 50, and wing 46 is coupled to propulsion system 54. Propulsion system 50 includes rotor assembly 58, and propulsion system 54 includes rotor assembly 62. Rotor assembly 58 includes rotor hub 66 and plurality of rotor blades 70 extending from rotor hub 66 and configured to rotate about axis 72. Similarly, rotor assembly 62 includes rotor hub 74 and plurality of rotor blades 78 extending from rotor hub 74 and configured to rotate about axis 80. Each of the plurality of rotor blades 70, 78 serve as a rotary wing that generates aerodynamic lift and thrust for aircraft 10. Each of rotor assemblies 58 and 62 can, for example, be coupled to and controlled with an engine and gearbox connected to a driveshaft, such as one continuous driveshaft extending from propulsion system 50 to propulsion system 54 or a segmented driveshaft separated by a gearbox.

Rotor assemblies 58 and 62 are controllable and positionable to, for example, enable control of direction, thrust, and lift of aircraft 10. For example, FIG. 1A illustrates aircraft 10 in a first configuration, in which propulsion systems 50 and 54 are positioned to provide a lifting thrust to aircraft 10, if activated. In the embodiment shown in FIG. 1A, propulsion systems 50 and 54 are positioned such that, if activated, aircraft 10 moves substantially in the Z direction ("helicopter mode"). In the embodiment shown in FIG. 1A, aircraft 10 further includes landing gear 82 with which aircraft 10 can contact a landing surface.

FIG. 1B illustrates aircraft 10 in a second configuration, in which propulsion systems 50 and 54 are positioned to provide a forward thrust to aircraft 10, if activated. In the embodiment shown in FIG. 1B, propulsion systems 50 and 54 are positioned such that, if activated, aircraft 10 moves substantially in the X direction ("airplane mode"). In the second configuration depicted in FIG. 1B, wings 42 and 46 enable a lifting thrust to be provided to aircraft 10. Though not depicted in FIGS. 1A-1B, propulsion systems 50 and 54 can be controllably positioned in helicopter mode, airplane mode, or any position between helicopter mode and airplane mode to provide for a desired direction, thrust, and/or lift. It should be appreciated that aircraft 10 is merely illustrative of a variety of aircraft that can implement the apparatuses and methods disclosed herein. Other aircraft implementations can include hybrid aircraft, tiltrotor aircraft, unmanned aircraft, gyrocopters, and a variety of helicopter configurations, to name a few examples. Further, the apparatuses and methods disclosed herein can be implemented to design and manufacture an airfoil member for a variety of aircraft structural implementations, such as aircraft propellers, wings, and tail rotor blades, for example. Even further, the apparatuses and methods disclosed herein can be implemented to design and manufacture tailored support networks in non-aircraft implementations, such as space structures, watercraft structures, underwater structures, general transportation vehicle structures, sporting structures, and wind turbine structures, for example.

Figure 2:
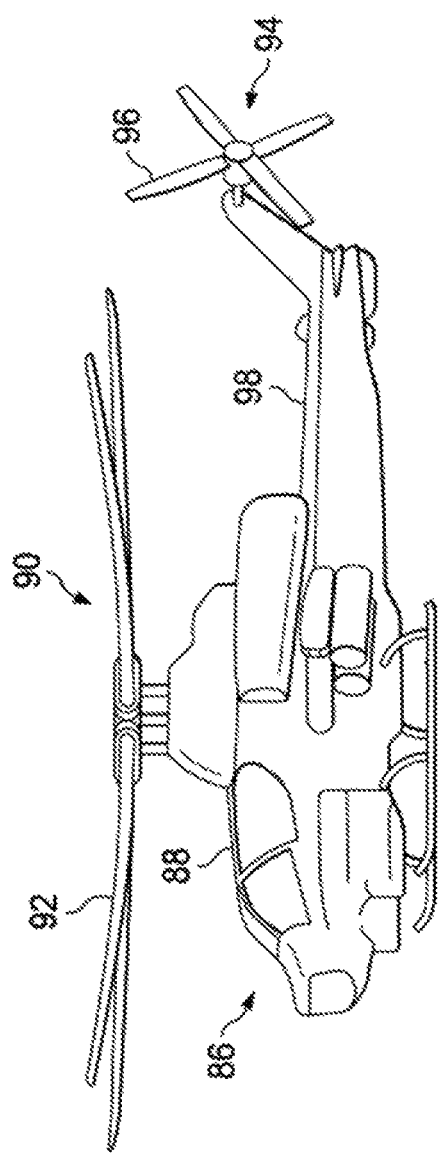
FIG. 2 is a perspective view of a helicopter, according to one example embodiment.

Referring to FIG. 2 in the drawings, a helicopter 86 is illustrated. Aircraft 86 comprises a fuselage 88, a main rotor assembly 90 with main rotor blades 92, and a tail rotor assembly 94 having tail rotor blades 96. Torque imparted to fuselage 88 by main rotor assembly 90 is counter-acted by tail rotor blades 96 in the tail rotor assembly 94 mounted on a tail portion 98 of fuselage 88. Main rotor and tail rotor assemblies 90, 94 are powered by a drive means under the control of a pilot.

Figure 3A:
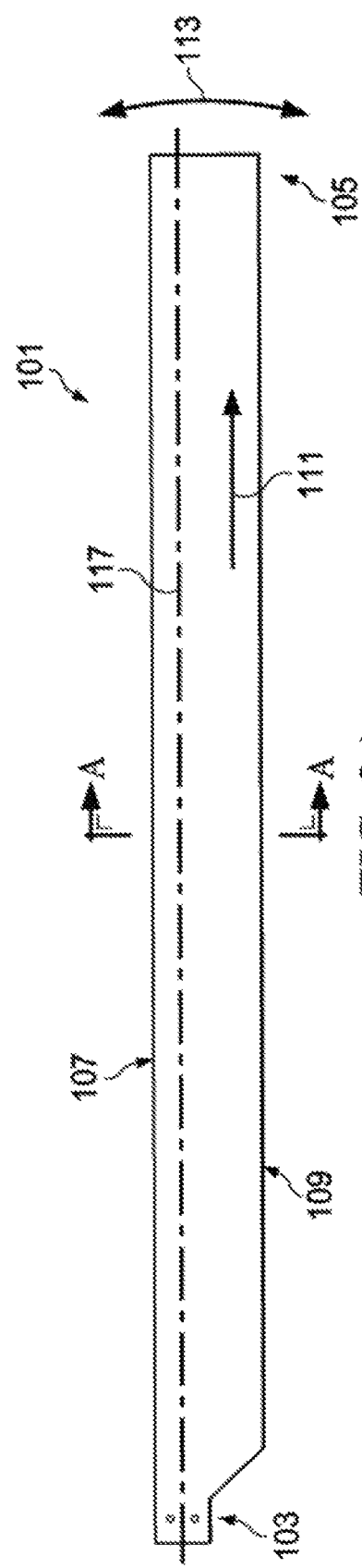
FIG. 3A is a top view of a rotor blade, according to one example embodiment.
Figure 3B:
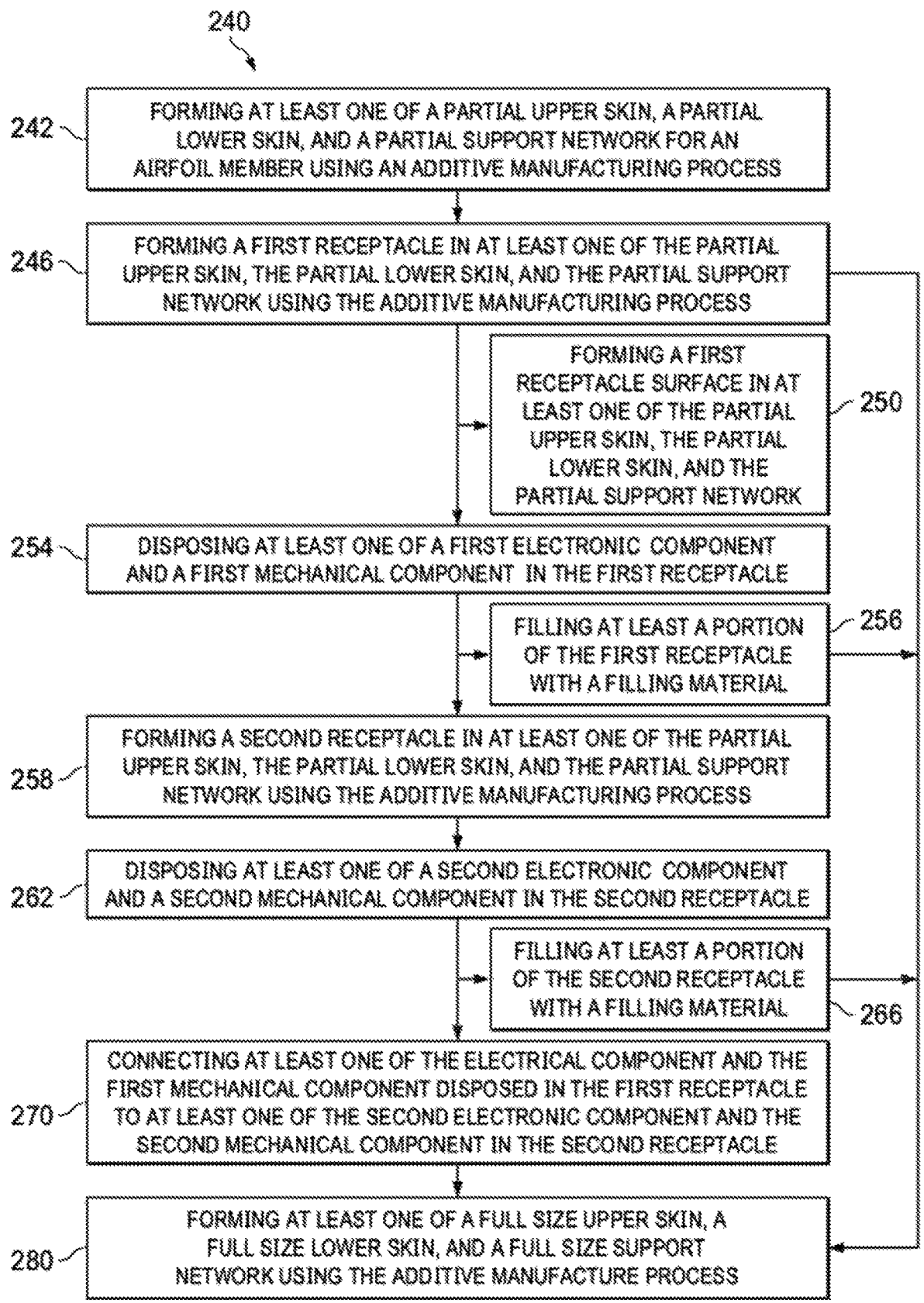
FIG. 3B is a flowchart illustrating a method of manufacturing a rotor blade, according to an illustrative embodiment.
Figure 3C:
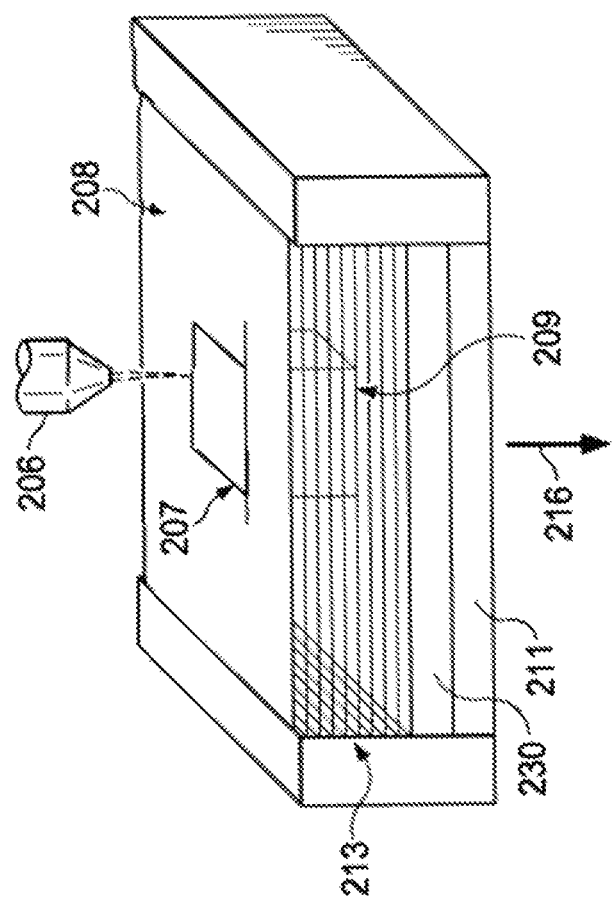
FIG. 3C is a schematic view of equipment and process used in a typical SLM manufacturing process, according to an illustrative embodiment.
Figure 4:
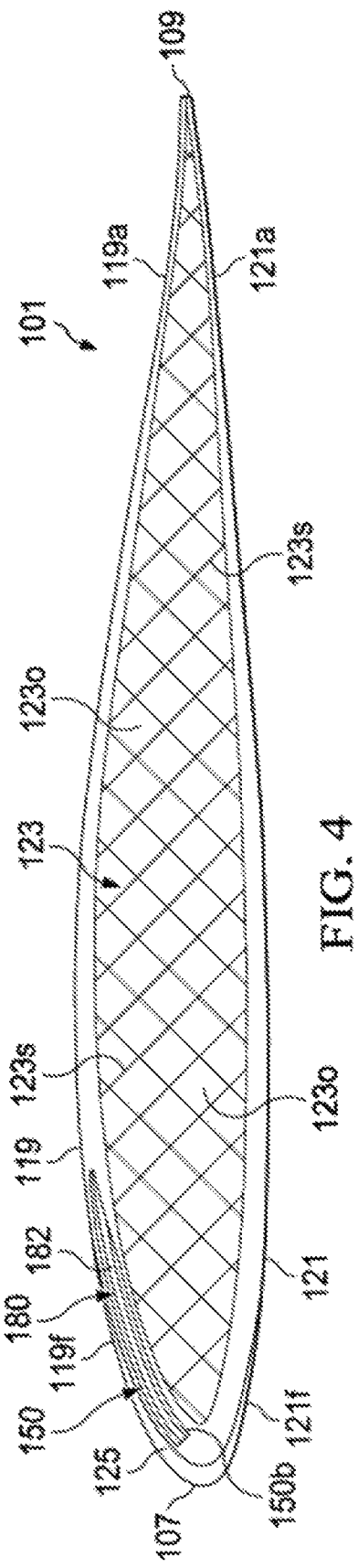

Referring now to FIGS. 3A-4, a rotor blade 101 configured with a support network 123 disposed between an upper skin 119 and lower skin 121 is illustrated (full size). Rotor blade 101 has a root end 103 and a tip end 105, which define a lengthwise axis therebetween. Rotor blade 101 also has a leading edge 107 and a trailing edge 109, which define a chordwise axis therebetween. Referring to FIGS. 3A and 4, rotor blade 101 can include an abrasion resistant portion 125. Upper skin 119 and lower skin 121 can have varying thicknesses which are implementation specific. In the illustrated embodiment, upper skin 119 and lower skin 121 are "structural skins" in that they function together with support network 123 and abrasion resistant portion 125 as a structural assembly. In some exemplary embodiments, the rotor blade 101 is configured as a rotary wing for at least one of following: the rotor assemblies 58, 62 for the tiltrotor aircraft 10; the main rotor assembly 90 for helicopter 86; and the tail rotor assembly 94 for helicopter 86.

During operation, according to some exemplary embodiments, the rotor blade 101 is subjected to a variety of loads to which the rotor blade design must accommodate. For example, rotor blade 101 of rotorcraft 10 can generate centrifugal forces (schematically illustrated with direction arrow 111), in-plane loads such as lead/lag loads (schematically illustrated with direction arrow 113), out-of-plane loads such as flapping loads (schematically illustrated with direction arrow 115 in FIG. 1A), and torsional loads of rotor blade 101 such as a twisting about pitch change axis 117. It should be appreciated that even though axis 117 is illustrated as a pitch change axis, axis 117 can broadly be a spanwise axis. Conventionally, the aforementioned dynamic loading causes stress and strains that are primarily reacted by a conventional spar (such as a D-shaped spar) in a conventional rotor blade.

Referring now to FIG. 3B, in some embodiments a method 240 may be used for forming a rotor blade 101. The method 240 can include the step 242 of forming at least one of a partial upper skin, a partial lower skin, and a partial support network using an additive manufacturing process and the step 246 of forming a first receptacle in at least one of the partial upper skin, the partial lower skin, and the partial support network using the additive manufacturing process.

In an exemplary embodiment of step 242, the partial upper skin, the partial lower skin, and the partial support network are each formed of one piece. In some embodiments of step 242, the partial upper skin or the partial lower skin is made of one piece with the support network.

The first receptacle formed in step 246 is configured to receive at least one of a first electronic component and a first mechanical component. The configuration of the first receptacle is designed to produce the desired support structure for the mechanical and/or electrical component disposed therein. In illustrated embodiments, first receptacle may take on a wide variety of configurations; for example, but not limitation, a rectangular prism, a cube, a cylinder, a cone, a sphere, an octagonal prism, a triangular prism, an octagonal prism. In some embodiments, the first receptacle is hollow. In an embodiment, the method 240 can include the step 250 of forming a first receptacle surface in at least one of the partial upper skin, the partial lower skin, and the partial support network. The first receptacle surface can include at least one layer having a uniform and/or varying thickness sufficient to support the electrical and/or mechanical component. In some embodiments, the first receptacle surface includes a plurality of layers with at least one of the layers being different from the others; for example, but not limitation, a different material and/or a different functionality.

In an exemplary embodiment, the first electronic component can include at least one of the following: an electric wire, a heater element, and a light emitting device. In an embodiment, the heater element is comprised of heater blanket. In some embodiments, the light emitting device is comprised of a tip light.

In an illustrative embodiment, the first mechanical component can include at least one of the following: a weight, a plurality of weights, a securing member, fastener, an abrasion strip, and an actuator. In some embodiments, the actuator can be operably connected to control surfaces to control the shape of the rotor blade 101. In other embodiments, the actuator is operably connected to one or more blade parts so that the blade and/or a portion of the blade may be folded or unfolded.

The method 240 includes the step 254 of disposing at least one of a first electronic component and a first mechanical component in the first receptacle. In an illustrative embodiment, at least one of the first electronic and/or mechanical components is disposed on the first receptacle surface.

In some embodiments, the method 240 includes the step of 256 of filling at least a portion of the first receptacle with a filler material. In an exemplary embodiment, the step 256 of filling all of the first receptacle with a filler material such that at least one of the first electronic and mechanical component is embedded within the first receptacle. In an exemplary embodiment, the filler material may be identical to the solidified layerwise base material. In some embodiments, the filler material may be dissimilar to the solidified layerwise base material. In some embodiments, the filler material can be solidified adhesive and/or polymeric material.

In yet still some embodiments, the method 240 includes a step 258 of forming a second receptacle in at least one of the partial upper skin, the partial lower skin, and the partial support network using the additive manufacturing process. The second receptacle is configured to receive of at least one of a second electronic component and a second mechanical component. The configuration of the second receptacle is designed to produce the desired support structure for the second mechanical and/or electrical component disposed therein. In illustrated embodiments, the second receptacle may take on a wide variety of configurations; for example, but not limitation, a rectangular prism, a cube, a cylinder, a cone, a sphere, an octagonal prism, and a triangular prism. In some embodiments, the second receptacle is hollow. In an embodiment, the method 240 can include the step of forming a second receptacle surface in at least one of the partial upper skin, the partial lower skin, and the partial support network. The second receptacle surface can include a layer having a uniform and/or varying thickness sufficient to support the electrical and/or mechanical component.

The method 240 can include the step 262 of disposing at least one of the second electronic component and the second mechanical component in the second receptacle.

In an exemplary embodiment, the second electronic component can include at least one of the following: an electric wire, a heater element, and a light emitting device. In an embodiment, the heater element is comprised of heater blanket. In some embodiments, the light emitting device is comprised of a tip light.

In an illustrative embodiment, the second mechanical component can include at least one of the following: a weight, a plurality of weights, a securing member, fastener, an abrasion strip, and an actuator. In some embodiments, the actuator can be operably connected to control surfaces to control the shape of the rotor blade 101. In other embodiments, the actuator is operable connected to one or more blade parts so that the blade and/or a portion of the blade may be folded or unfolded.

In an embodiment, the method 240 includes the step 266 of filling at least a portion of the second receptacle with a filler material. In an exemplary embodiment, the step 266 of filling all of the second receptacle with a filler material such that at least one of the second electronic and mechanical component is embedded within the second receptacle. In an exemplary embodiment, the filler material may be identical to the solidified layerwise base material. In some embodiments, the filler material may be dissimilar to the solidified layerwise base material. In some embodiments, the filler material can be solidified adhesive and/or polymeric material.

In yet another embodiment, the method 240 can include the step 270 of connecting at least one of the first electronic component and the first mechanical component disposed in the first receptacle to at the least one of the second electronic component and the second mechanical component in the second receptacle.

In an illustrative embodiment, the method 240 can include the step 280 of forming at least one of a full size upper skin 119, a full size lower skin 121, and a full size support networking 123 using the additive manufacturing process, which can ultimately be used to manufacturing the rotor blade 101.

The additive manufacturing process of method 240 comprises a Solid Freeform Fabrication (SFF) method. The SFF method includes a group of emerging technologies that have revolutionized product development and manufacturing. The common feature shared by these technologies is the ability to produce freeform, complex geometry components directly from a computer generated model. SFF processes generally rely on the concept of layerwise material addition in selected regions. A computer generated virtual model serves as the basis for making a real model. The virtual model is mathematically sliced and each slice is recreated in the material of choice to build a complete object. A typical SFF machine can be likened to a miniaturized "manufacturing plant" representing the convergence of mechanical, chemical, electrical, materials and computer engineering sciences.

Various embodiments described herein include advancements and improvements in or related to the use of SFF and Rapid Prototyping (RP) or "additive" manufacturing processes, including Selective Laser Sintering (SLS), Direct Metal Laser Sintering (DMLS), Electron Beam Melting (EBM) and Selective Laser Melting (SLM) techniques, in the design, selection, development, manufacturing and/or repairing of rotor blades and rotor blade components.

Various embodiments, and the various SFF manufacturing techniques described herein, including SLS, DMLS, EBM or SLM manufacturing, may be utilized to create a tailored support network 123 having an arrangement with complex geometries and densities. In some embodiments, the various SFF manufacturing techniques described herein, including SLS, DMLS, EBM, or SLM manufacturing, may be utilized to create at least one of a partial and/or full size upper skin 119; a partial and/or full size lower skin 121; a partial and/or full size support network 123a; a partial and/or full first receptacle 150p, 150; and a partial and/or second full receptacle 160p, 160. Various technologies appropriate for manufacturing rotor blades and components therefor are known in the art, for example, as described in Wohlers Report 2009, *State of the Industry Annual Worldwide Progress Report on Additive Manufacturing*, Wohlers Associates, 2009 (ISBN 0-9754429-5-3), available from the web www.wohlersassociates.com, Pham and Dimov, *Rapid manufacturing*, Springer-Verlag, 2001 (ISBN 1-85233-360-X); Grenda, *Printing the Future, The 3D Printing and Rapid Prototyping Source Book*, Castle Island Co., 2009; Liou, *Rapid Prototyping and Engineering Applications: A Toolbox for Prototype Development*, CRC, Sep. 26, 2007 (ISBN: 10: 0849334098; 13: 978-0849334092); *Advanced Manufacturing Technology for Medical Applications: Reverse Engineering, Software Conversion and Rapid Prototyping*, Gibson (Ed.), Wiley, January 2006 (ISBN: 10: 0470016884; 13: 978-0470016886); and Branner et al., "Coupled Field Simulation in Additive Layer Manufacturing," 3rd International Conference PMI, 2008.

Exemplary methods for forming rotor blades and/or rotor blade components:

| Technique | Brief description of technique and related notes |
| --- | --- |
| CNC | CNC refers to subtractive manufacturing, which can be computer numerically controlled (CNC) machine tools, a computer driven technique, e.g., computer-code instructions, in which machine tools are driven by one or more computers. |

-continued

| Technique | Brief description of technique and related notes |
| --- | --- |
| Binder Jetting | Binder Jetting refers to an additive manufacturing technology. Binder Jetting uses layers of powder and a binder deposited onto the powder as opposed to heat. |
| Rapid prototyping | Rapid prototyping refers generally to automated construction of prototype or product using an additive manufacturing technology such as EBM, SLS, SLM, SLA, DMLS, 3DP, FDM, and other technologies. |
| EBM ® | EBM ® refers to electron beam melting, which is a powder-based additive manufacturing technology. Typically, successive layers of metal powder are deposited and melted with an electron beam in a vacuum. |
| SLS | SLS refers to selective laser sintering which is a powder-based additive manufacturing technology. Typically, successive layers of a powder (e.g., polymer, metal, sand, or other material) are deposited and melted with a scanning laser, for example a carbon dioxide laser. |
| SLM | SLM refers to selective laser melting, which is an additive manufacturing technology similar to SLS; however, with SLM the powder material is fully melted to form a fully dense product. |
| SLA or SL | SLA or SL refer to stereolithography, which is a liquid-based additive manufacturing technology. Typically, successive layers of a liquid resin are exposed to a curing, for example, UV laser light, to solidify each layer and bond it to the layer below. This technology typically requires the addition and removal of support structures when creating particular geometries. |
| DMLS | DMLS refers to direct metal laser sintering, which is a powder-based additive manufacturing technology. Typically, metal powder is deposited and melted locally using a fiber optic laser. Complex and highly accurate geometries can be produced with this technology. This technology supports net-shaping, which means that the product generated from the technology requires little or no subsequent surface finishing. |
| LC | LC refers to LaserCusing ® (LC), which is a powder-based additive manufacturing technology. LC is similar to DMLS; however, with LC a high-energy laser is used to completely melt the powder, thereby creating a fully-dense product. |
| 3DP | 3DP refers to three-dimensional printing (3DP), which is a high-speed additive manufacturing technology that can deposit various types of materials in powder, liquid, or granular form in a printer like fashion. Deposited layers can be cured layer by layer or, alternatively for granular deposition, an intervening adhesive step can be used to secure layered granules together in a bed of granules, which can be used to form multiple layers subsequently cured together, for example, with laser or light curing. |
| LENS | LENS ® refers to Laser Engineered Net Shaping ™, which is a powder-based additive manufacturing technology. Typically, metal powder is supplied to the focus of the laser beam at deposition head. The laser beam melts the powder as it is applied, in raster fashion. The process continues layer by layer and requires no subsequent curing. This technology supports net-shaping, which means that the product generated from the technology requires little or no subsequent surface finishing. |
| FDM | FDM refers to fused deposition modeling ™ (FDM) is an extrusion-based additive manufacturing technology. Typically, beads of heated extruded polymers are deposited row by row and layer by layer. The beads harden as the extruded polymer cools. |

In an embodiment, at least one of the steps 242, 246, 250, 256, 258, 266, and 280 use an additive manufacturing process including at least one of the following: electron beam melting, selective laser sintering, selective laser melting (SLM), stereolithography, direct metal laser sintering, three-dimensional printing, fused deposition modeling, laser curing and lasered engineered net shaping. In some embodiments at least steps 242 and 246, and, optionally, step 256 use an additive manufacturing process including at least one of the following: electron beam melting, selective laser sintering, selective laser melting (SLM), stereolithography, direct metal laser sintering, three-dimensional printing, fused deposition modeling, laser curing and lasered engineered net shaping. In some embodiments, the steps 242, 246, 250, 256, 258, 266, and 280 use the same additive manufacturing process including at least one of the following: electron beam melting, selective laser sintering, selective laser melting (SLM), stereolithography, direct metal laser sintering, three-dimensional printing, fused deposition modeling, laser curing and lasered engineered net shaping.

According to an illustrative embodiment, the additive manufacturing process uses a layerwise base material for the steps 242, 246, 250, 256, 258, 266, and 280. Any material known in the art can be used for the layerwise base material, for example including, but not limited to metal, metal foil, metal film, metal wire, molten metal, metallic powders, metal alloys, combinations of metals, ceramics, plastic, polyethylene, cross-linked polyethylene's or polymers or plastics, pyrolytic carbon, nanotubes and carbons, short fiber reinforced composites, particles, long and/or continuous fiber reinforced composites, plant derived composites, recycled composites, nanotube infused resin, microtube infused composites, as well as metal matrix composite materials. In certain embodiments, the layerwise base material is a thermoplastic material, for example, a resin. In one exemplary embodiment, the layerwise base material is a polyether imide resin commercially available as ULTEM™ 9085 by Stratasys Ltd. The layerwise base material can comprise a resin incorporating a strengthening additive (e.g., a strengthening additive is a material that can increase the ultimate strength of at least one of the rotor blade and/or the upper skin, the lower skin, the support network, the receptacle, receptacle surface). The strengthening additive can include a fiber and/or particle made of glass, carbon, graphite, basalt, an aromatic polyamide (i.e. "aramid") material, a variant of an aromatic polyamide material (e.g., a polyparaphenylene terephthalamide material, such as Kevlar® by E.I. du Pont de Nemours and Company of Richmond, Va.), or the like. In an exemplary embodiment, the layerwise base material is a composite polyamide material incorporating carbon fiber as the strengthening additive, which is commercially available as WINDFORM® XT 2.0 by CRP USA LLC.

In an exemplary embodiment, the steps 242, 246, 250, 256, 258, 266, and 280 can include using a plurality of additive manufacturing processes (e.g., a series of additive manufacturing processes). In an example, a full size support network 123 can be formed from SLM, then a full size lower skin 121 can be formed by stereolithography. In yet another example, each of steps 242, 246, 250, 256, 258, 266, and 280 can include using a plurality of additive manufacturing processes to manufacture one component (e.g., full size upper skin 119, full size lower skin 121, full size support network 123). For example, but not limited to, a first partial portion of the support network 123*p* can be formed by SLM and a second partial portion of the support network 123*p* can be formed by stereolithography. The first and second partial portions of the support network 123*p* can be combined with adhesive or using other manufacturing techniques, including an additive manufacturing process.

FIG. 3C depicts a schematic view of equipment and the process used in a typical SLM manufacturing process. SLM is a powder bed 208 process that begins with the deposition of a thin layer of powder onto a substrate 230, which can be disposed on a processing table 211. A high power laser 206 scans the surface of the powder, generating heat that causes the powder particles to melt (see melted powder 207) and form a melt pool which solidifies as a consolidated layer of material. Once the layer has been scanned and relevant portions melted/solidified, another layer of powder is deposited, which is then subsequently scanned and melted/solidified to form the next layer of the part. This process continues with multiple layers 213 until enough layers of material have been deposited/melted/solidified to create a desired object 209. Powder particles that are not melted remain loose and are removed 216 (and can typically be reused) once the component is complete.

Referring now to FIGS. 4-5, schematic cross-sectional views are shown of embodiments of a rotor blade made by the method of forming a rotor blade 240. Specifically, FIG. 4 shows the rotor blade 101 comprising a full size upper skin 119, a full size lower skin 121, and a full size support network 123 including support members 123*s*. Additive manufacturing according to the method 240 permits tailoring of the upper skin 119, lower skin 121 and/or support network 123 design. FIG. 4 is an example embodiment of the support network 123 having a lattice arrangement with uniform support members 123*s* that are solid and a generally uniform density; however, the exact, size, shape and material of support network is implementation specific. Further, support network 123 is illustrated in a lattice arrangement having support members 123*s* that define openings 123*o* having square and triangle shapes; however, the disclosure herein is not limited to a lattice arrangement having square and triangle shaped openings, rather other shaped openings, for example, but not limitation, rectangle, pentagon, octagon, trapezoid, and non-geometric organic shapes etc., can also be implemented. The size of each support member 123*s* can be tailored (e.g., length, width, depth, outer diameter, etc.). In the exemplary embodiment, the width of the support members 123*s* is uniform, while the length of the support members 123*s* is varied. In some embodiments, the length of the support members 123*s* may vary gradually or in discrete portions in a chordwise direction as shown in FIG. 4. In some embodiments, the support members 123*s* can be wider and/or have a varied outer diameter; for example, but not limitation, in areas where it is desirable to address in flight stresses and strains the outer diameter of the support member 123*s* can be larger than in areas with less stress and strains. In some embodiments, the support members 123*s* are solid (e.g., solid layerwise base material). Solid means formed with no voids therein.

In the exemplary embodiment shown in FIG. 4, the full size upper and lower skins 119 and 121 are thicker at the leading edge as compared the thickness at the trailing edge 109. The full size upper skin 119 was formed according to method 240 and includes a first receptacle 150. In this exemplary embodiment, the first receptacle 150 is configured to receive the first electronic component 180 therein. The first receptacle 150 supports and maintains the position of the first electronic component 180 in the upper skin 119; for example, the heater element 182 therein. The first receptacle 150 includes a first receptacle surface 150*b* configured to receive the heater element 182 thereon. For example, the first receptacle surface 150*b* can include an upward protrusion or a downward protrusion configured to mate with heater element 182. In some embodiments, the first receptacle surface 150 is formed of a layerwise base material (and in some embodiments a plurality of layerwise base materials including at least one different material) that facilitates the function of the first electronic component thereon (for example, but not limitation, thermally conductive material, electrically conductive material, vibration isolator material, vibration absorbing material) and, according to some embodiments, is different from the adjacent base material. In the exemplary embodiment shown in FIG. 4, the first receptacle surface 150b surrounds the heater element 182 (e.g., on the top, bottom, sides). The method 240 permits the first electronic component 180 to be positioned and disposed in the upper skin 119 during at least the forming steps 246, 250, and/or 280.

Referring now to FIG. 5, where like features are identified by like numerals with a primed suffix ('), the full size upper and lower skins 119', 121' have a generally uniform thickness that can have a thin profile (e.g., thinner than a skin produced using conventional manufacturing methods). To support the stress and strains incurred during flight the density of the support members 123s' in the support network 123' can be tailored. Density can mean the number of cells or holes per units of width. An exemplary support network 123 in FIG. 4 has a uniform density of about 21 cells along the chordwise axis extending from the leading edge 107 to the trailing edge 109, which can be a density of about 0.7 cell per inch. The density can be increased such that there are more cells or holes per units of width as compared to other areas in the support network. For example, in an embodiment shown in FIG. 5, the support network 123' has a lattice arrangement with closely compacted portions 131 and open cell portions 133. The closely compacted portions 131 can be located within the support member 123s to increase strength/stiffness to accommodate in-plane, out-of-plane, and torsional loads.

In the embodiment shown in FIG. 5, there can be a plurality of closely compacted portions 131 adjacent to the leading edge 107. There can be a first closely compacted portion 131f adjacent to the leading edge 107 having a density greater (e.g., having about 4 cells per inch in the first leading edge portion, which can be the first one/fifth of the chordwise width of the rotor blade 101) than a second, third and fourth closely compacted portions 131s, 131t, 131r. The second closely compacted portion 131s can be located in an upper portion above the chordwise axis (e.g., adjacent to the upper skin 119) and in a leading edge portion having a density less than the first closely compacted portion 131f (e.g., the second closely compacted portion has about 3 cells per inch). The third closely compacted portion 131t can be located in a lower portion below the chordwise axis (e.g., adjacent to the lower skin 121) and in a leading edge portion having a density less than the first closely compacted portion 131f (e.g., the third closely compacted portion has about 3 cells per inch). The fourth closely compacted portion 131r can be disposed aft of the first closely compacted portion and can have a density less than the first, second, and third closely compacted portions (e.g., the fourth closely compacted portion 131r can have about 1 cell per inch). In an embodiment, the second and third closely compacted portions 131s, 131t are in out-of-plane configurations.

The full size support network 123' was formed according to method 240 and includes a first receptacle 150'. In this exemplary embodiment, the first receptacle 150' is configured to receive the first mechanical component 190 therein. The first receptacle 150' supports and maintains the position of the first mechanical component 190 in the support network 123'; for example, the balance weights 192 therein. The first receptacle 150' includes a first receptacle surface 150b' configured to receive the balance weights 192 and a filler material 170 therein. For example, the first receptacle surface 150b' can include upward protrusions or downward protrusions configured to mate or hold the position of the balance weights therein. The balance weights 192 in this embodiment are a plurality of spheroid weighted elements suspended in the filler material 170. The method 240 permits the spheroid weights to be positioned on the first receptacle surface 150b' and/or in the filler material 170 during the forming step 250 and filling step 256. In this example embodiment, the filler material 170 surrounds all of the balance weights 192 in the first receptacle 150' such that the filler material 170 and balance weights 192 are integral with the support network 123'. Advantageously, the method 240 permits the tailoring of the position and density of the balance weights 192 in the first receptacle 150 such that the position and functionality of the balance weights 192 is maintained in spite of the high centrifugal forces and loads that occur during operation.

Figure 7:
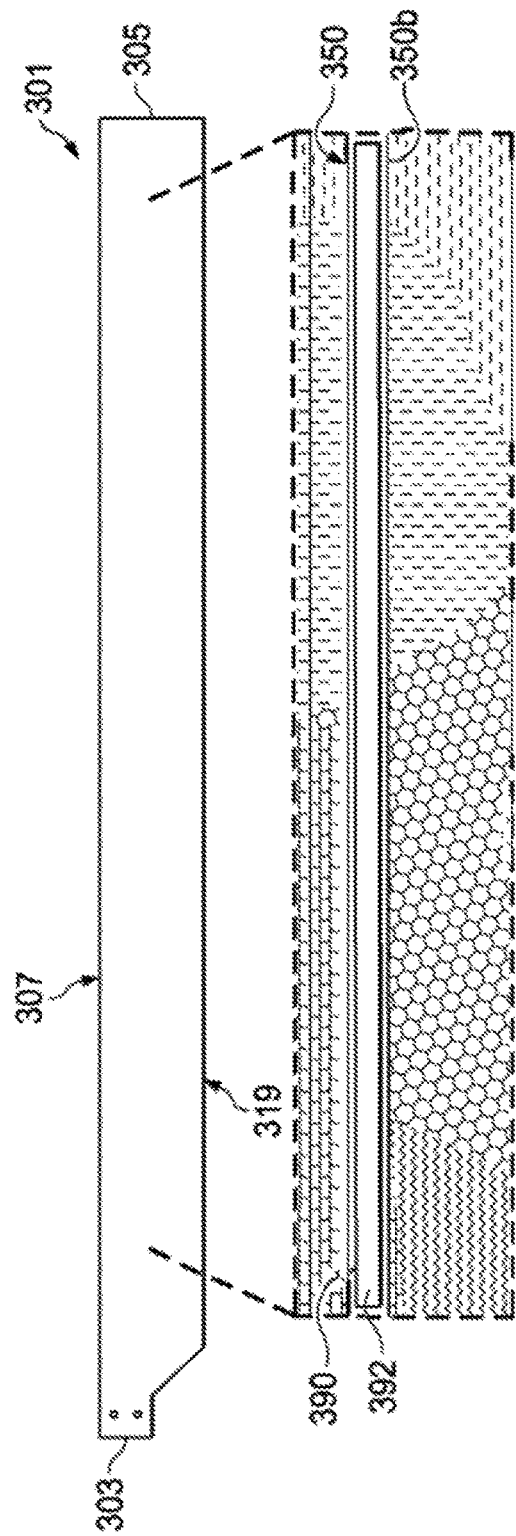
FIG. 7 is a schematic top view of the rotor blade in FIG. 6.

FIGS. 6-7 illustrate another schematic example of a rotor blade 301. Certain components of the rotor blade 301 are as described above, except as noted herein. Those components bear similar reference characters to the components of the rotor blade 101, but with a leading '3' rather than a leading '1'. The rotor blade 301 includes a support network 323 having both lattice arrangement portions 337a, 337b, 337c and reticulated portions 339a, 339b. In an embodiment, as shown in FIG. 6, the lattice arrangement portions 337a, 337b, 337c are different lattice arrangements. In an embodiment, the reticulated portions 339a, 339b have similar reticulated arrangements but are disposed in different areas (e.g., a leading edge portion 301f and a trailing edge portion 301a, respectively). It should be appreciated that support member 323 can take on a wide variety of configurations and FIGS. 6-7 are schematic representations of possible arrangements (e.g., reticulated portions 339a, 339b can have varied arrangements and the lattice arrangement portions 337a, 337b, 337c can have similar lattice arrangements). In an embodiment, there are no seams between the lattice arrangement portions 337a, 337b, 337c and reticulated portions 339a, 339b.

The full size support network 323 was formed according to method 240 and includes a first receptacle 350. In this exemplary embodiment, the first receptacle 350 is configured to receive the first mechanical component 390 therein. The first receptacle 350 supports and maintains the position of the first mechanical component 390 in the support network 323. The first receptacle 350 includes a first receptacle surface 350b configured to receive the balance weight 392. The balance weight 392 is a one piece balance weight that can extend within the support network 323 as shown in FIG. 7. According to this exemplary embodiment, the first receptacle surface 350b surrounds the balance weight 392. In some embodiment, the first receptacle surface 350 is thicker on the side adjacent to the tip 305 as compared to the side of the first receptacle 350 adjacent to the root 303. The method 240 permits the balance weight 392 to be positioned and disposed on the first receptacle surface 350b during the forming steps 246, 250. In this example embodiment, the first receptacle 350 surrounds all the balance weight 392 such that the first receptacle 350 and balance weight 392 are integral with the support network 323. Advantageously, the method 240 permits the tailoring of the position and shape of the balance weight 392 in the first receptacle 350 such that the position and functionality of the balance weight 392 is maintained in spite of the high centrifugal forces and loads that occur during operation.

Figure 8:
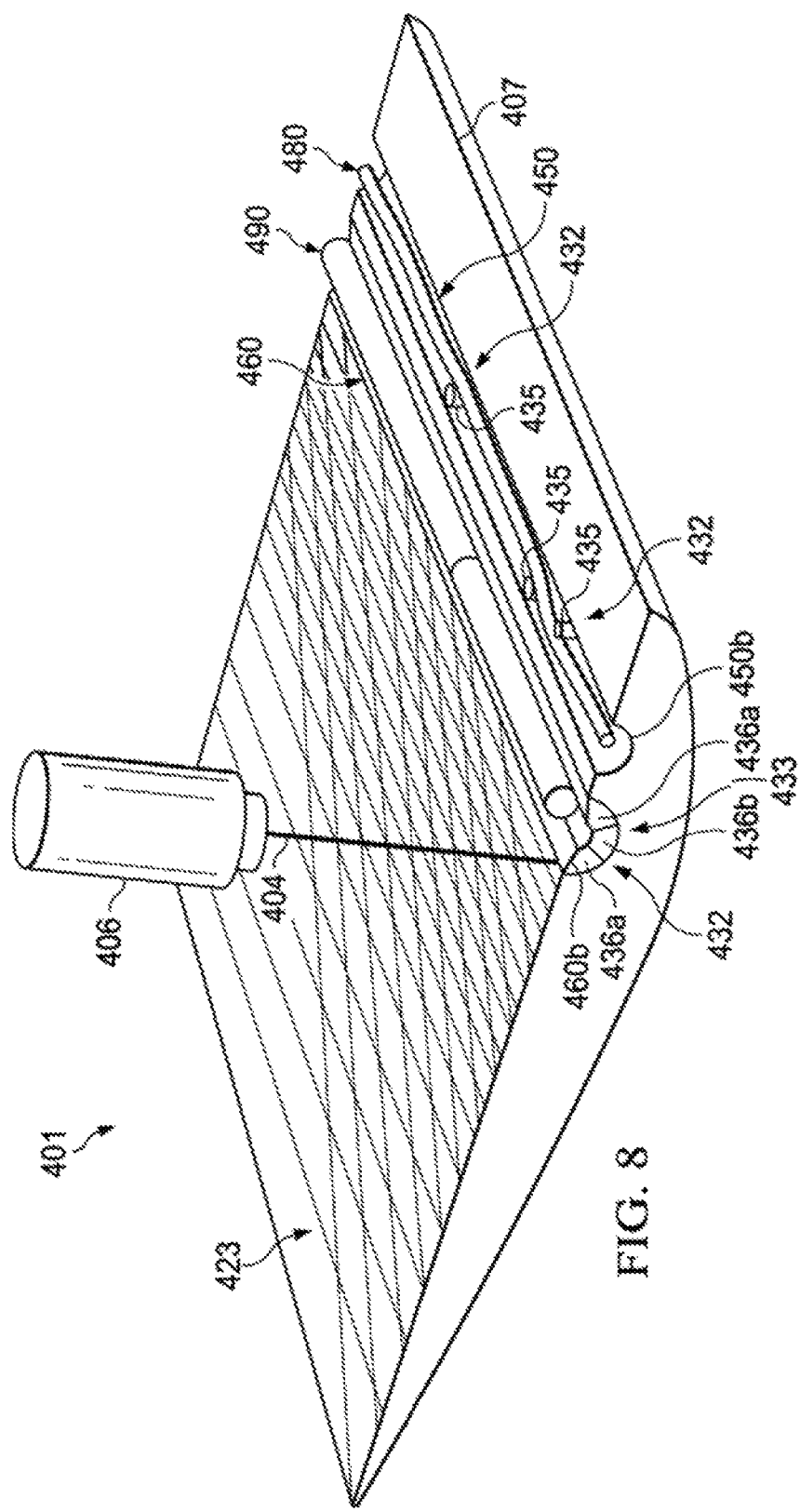
FIG. 8 is a schematic view of a fused deposition modeling device forming a receptacle surface in a receptacle of a rotor blade, according to an exemplary embodiment.

FIG. 8 illustrates another schematic example of a rotor blade 401. Certain components of the rotor blade 401 are as described above, except as noted herein. Those components bear similar reference characters to the components of the rotor blade 101, but with a leading '4' rather than a leading '1'. The rotor blade 401 includes a support network 423 with a first receptacle 450 and a second receptacle 460 each having a first receptacle surface 450b and a second receptacle surface 460*b*, respectively. The FDM device 406 extrudes the base material 404 therefrom to form at least one of the upper skin, the lower skin, the support network, the respective receptacle, the receptacle surface, and/or the filler material. In this schematic figure, the extruded base material 404 is shown forming the second receptacle surface 460*b*.

In some embodiments, the first and second receptacle surfaces 450*b*, 460*b* can include one or more locating features 432 for determining the location of at least one of the electrical component 480 and the mechanical component 490 therein and/or thereon. In an exemplary embodiment, the locating features 432 are comprised of at least one of an inward receiving feature having a channel, recess, depression, and/or a lower sunken area in the respective receptacle surface. In some embodiments, the locating feature 432 is comprised of at least one of a protrusion which can be any structure projecting from the receptacle surface. In some embodiments, the second receptacle surface 460*b* includes a first channel 433 for receiving a mechanical component 490 therein, respectively. In some embodiments, the first receptacle surface 450*b* includes a plurality of protrusions 435 to assist in securing the electrical component 480 on the first receptacle surface 450*b*. Advantageously, forming the receptacle surface with one or more locating features 432 provide reference points for positioning components therein and/or thereon to facilitate manufacturing, which substantially reduces time and expense during assembly, and provides a rotor blade with improved overall performance by securing the components therein and/or thereon.

In an exemplary embodiment, the first receptacle surface 450*b* is formed of a thermally conductive material to transmit heat to support network 423 and upper and lower skins of the rotor blade 401. In another exemplary embodiment, the second receptacle surface 460*b* is formed of a plurality of layers of the base materials with at least one of the layers being different from the others. For example, but not limitation, the plurality of layers in the second receptacle surface 460*b* includes a vibration isolator material 436*a* and a vibration dampening material 436*b*. Advantageously, the receptacle surface formed with a layer or a plurality of layers can provide a tailored surface and functionality that improves the aerodynamic performance and safety of the rotor blade 401 as well as eliminate the need for costly cutting, splicing and joining of support materials adjacent to electrical and/or mechanical components.

Figure 9:
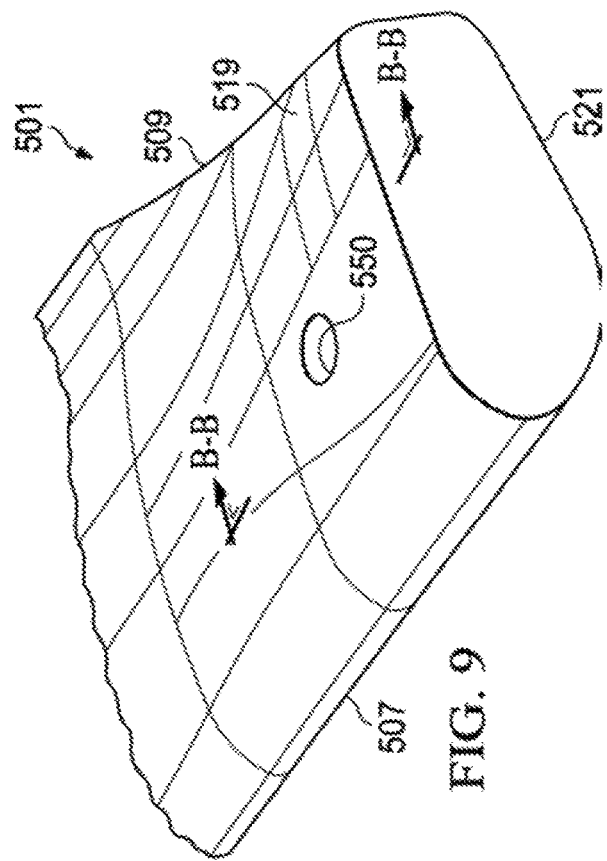
FIG. 9 is a partial perspective view of a root end of a rotor blade.
Figure 10A:
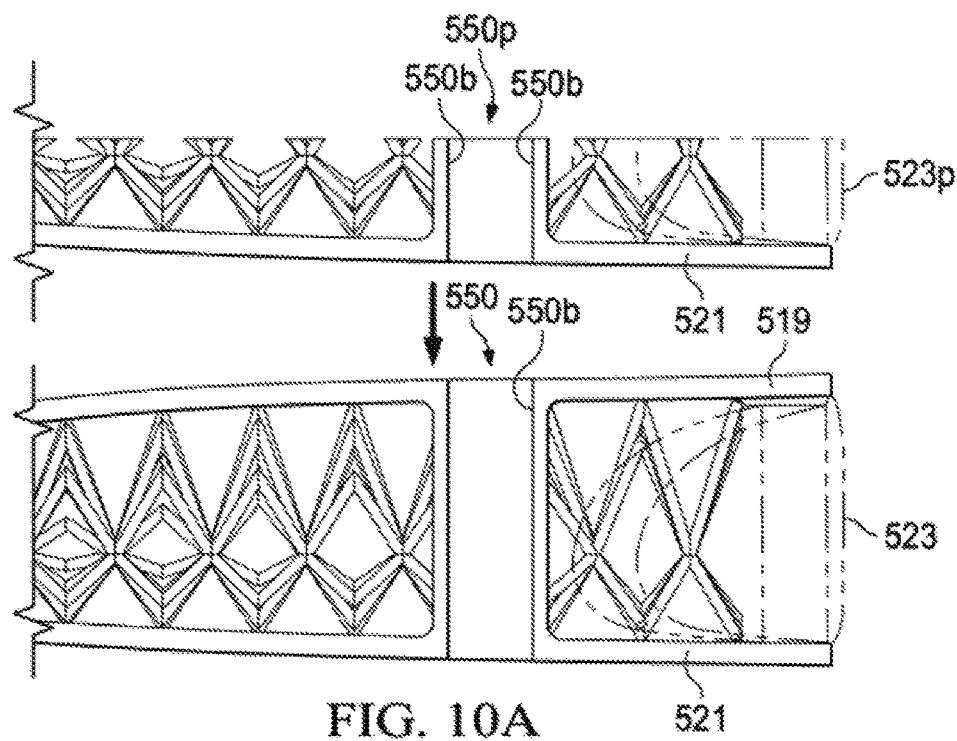
FIGS. 10A-10B are schematic cross sectional views of illustrative embodiments of a partial rotor blade and full size rotor blade taken from section lines B-B in FIG. 9.
Figure 10B:
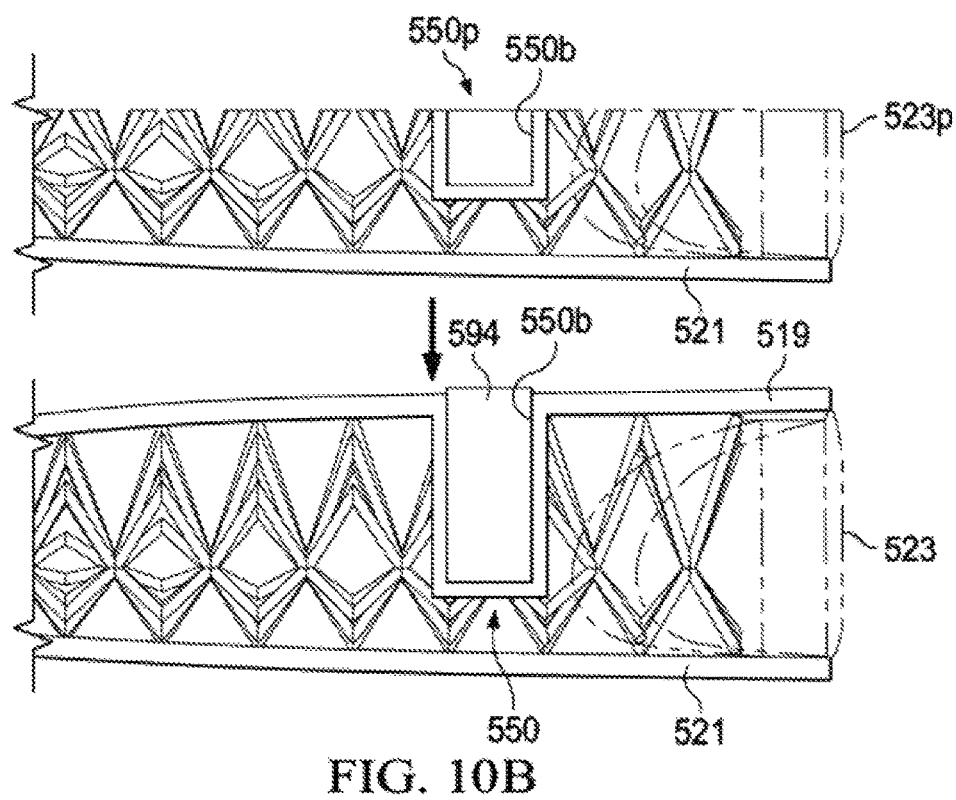
Figure 10C:
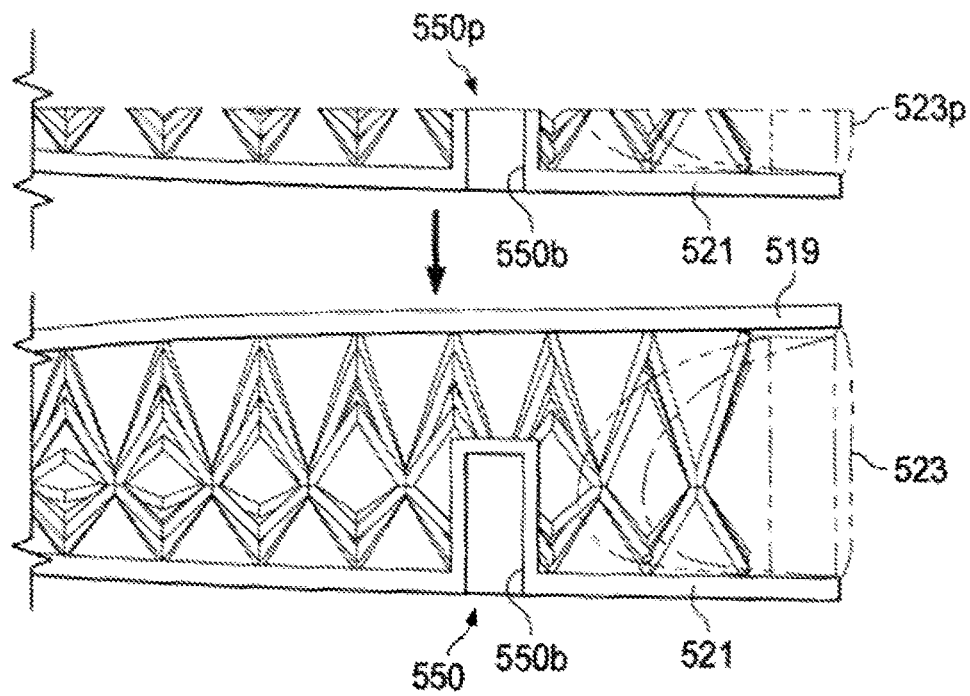
FIGS. 10C-10D are schematic cross sectional views of illustrative embodiments of partial rotor blades and full size rotor blades.
Figure 10D:
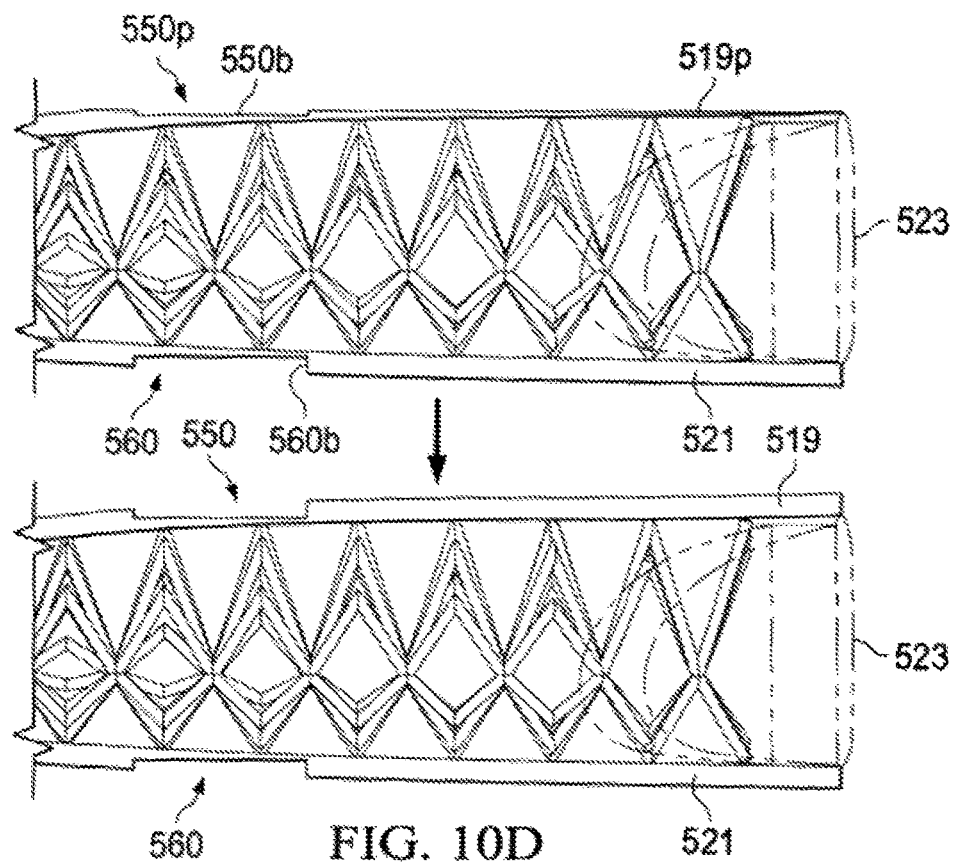

FIGS. 9-10D illustrate another schematic example of a rotor blade 501. FIG. 9 illustrates the root end of rotor blade 501 including a first receptacle 550. Those components bear similar reference characters to the components of the rotor blade 101, but with a leading '5' rather than a leading '1'. The full size support network 523 and upper, lower skins 519, 521 were formed according to the method 240 and can include a first receptacle 550 and in some embodiments a second receptacle 560. The first receptacle 550 described in FIGS. 10A-10B is configured for a main bolt hole, which is disposed in the root end of blade 501. FIG. 10A illustrates an exemplary embodiment of the method 240 including forming a full lower skin 521 and a partial support network 523*p* having a partial first receptacle 550*p* that is ultimately formed into a full size first receptacle 550 that extends completely through the full size lower skin, support network, and upper skin 521, 523, 519 and can receive a mechanical component therein (e.g., a fastener member). FIG. 10B illustrates an exemplary embodiment of the method 240 including forming a full lower skin 521 and a partial support network 523*p* having a partial first receptacle 550*p* that is ultimately formed into a full size first receptacle 550 that extends completely through the full size upper skin 519 and has an end in the support network 523 and can receive the fastener member 594 therein.

FIGS. 10C-10D are schematic cross sectional views of illustrative embodiments of other embodiments of first and second receptacles in rotor blade 501. FIG. 10C illustrates an exemplary embodiment of the method 240 including forming a full lower skin 521 and a partial support network 523*p* having a partial first receptacle 550*p* that is ultimately formed into a full size first receptacle 550 that extends completely through the full size lower skin 521 and has an end in the support network 523 and can receive the fastener member 594 therein. FIG. 10D illustrates an exemplary embodiment of the method 240 including forming a full support network 523 and lower skin 521 and a partial upper skin 519*p* having a partial first receptacle 550*p* that is ultimately formed into a full size first receptacle 550 that extends partially through the full size upper skin 519 and can receive an electrical and/or mechanical component therein.

FIG. 11 illustrates another schematic example of a rotor blade 601. Certain components of the rotor blade 601 are as described above, except as noted herein. Those components bear similar reference characters to the components of the rotor blade 501, but with a leading '6' rather than a leading '1'. The full size support network 623 and upper skin 619 were formed according to the method 240 and include a first receptacle 650 and a second receptacle 660, respectively. The first receptacle 650 is as shown and described with regard to FIG. 5 (e.g., first receptacle 150') In the illustrative embodiment, the second receptacle 660 is configured to receive a first electrical component 684 and second electrical component 686 therein. The second receptacle 660 supports and maintains the position of the first and second electrical components 684, 686 in the second receptacle 660 disposed in the upper skin 619. The second receptacle 660 includes a first portion 660*y* configured to receive the first electrical component (e.g., a wire) 684 and a second portion 660*z* at the tip 605 configured to receive a light emitting device 686; for example, but not limitation, a tip light. The wire 684 and light emitting device 686 can be electrically connected during or after the steps in method 240. The method 240 permits the plurality of mechanical and electrical components to be positioned and disposed in the respective receptacle (e.g., first and second receptacles 650, 660) during the steps of at least 246, 250, 254, 256, 258, 262, 270, and/or 280. Advantageously, the method 240 permits the tailoring of the first and second receptacles 650, 660) such that the position and functionality of the mechanical and electrical components can be maintained in spite of the high centrifugal forces and loads that occur during operation.

FIG. 12 illustrates another schematic example of a rotor blade 701. Certain components of the rotor blade 601 are as described above, except as noted herein. Those components bear similar reference characters to the components of the rotor blade 501, but with a leading '7' rather than a leading '1'. The full size support network 723 was formed according to the method 240 and includes a first receptacle 750 and a second receptacle 760. In the illustrative embodiment, the first receptacle 750 is configured to receive a plurality of mechanical 798 components including a drive device 797 and an actuator 796*a* operably connected to an actuated member 796*b*. The drive device 797 can be a connector member for transferring hydraulic and/or mechanical power therein to the actuator and/or other mechanical components. The actuator 796*a* and actuator member 796*b* are schematically shown. The actuator 796*a* can be a linear actuator, a rotary actuator, or still another type of actuator that can rotate or move the position of the actuator member 796*b*. The actuator member 796*b* can be a part of the rotor blade that can be moved by the actuator 796*a* (e.g., flaps). The first receptacle 750 supports and maintains the position of the plurality mechanical components 798 therein. The first receptacle 750 includes first and second interconnected portions 750*y*, 750*z* configured to support and mechanically communicate the plurality of mechanical components 798 therein. The method 240 permits the plurality of mechanical components 798 to be positioned and disposed in the first receptacle during the steps of at least 246, 250, 254, 256, 258, 262, 270, and/or 280. Advantageously, the method 240 permits the tailoring of the first receptacle 750 such that the position and functionality of the plurality of mechanical components 798 can be maintained in spite of the high centrifugal forces and loads that occur during operation.

In the illustrative embodiment, the second receptacle 760 is configured to receive a plurality of electrical 788 components including two heater elements 782 with wires 784. The second receptacle 760 supports and maintains the position of the plurality electrical components 788 therein. The second receptacle 760 includes first, second, third, and fourth interconnected portions 760*w*, 760*x*, 760*y*, 760*z* configured to support and electrically communicate the plurality of electrical components 788 therein. The method 240 permits the plurality of electrical components 788 to be positioned and disposed in the second receptacle during the steps of at least 246, 250, 254, 256, 258, 262, 270, and/or 280. Advantageously, the method 240 permits the tailoring of the second receptacle 760 such that the position and functionality of the plurality of electrical components 788 can be maintained in spite of the high centrifugal forces and loads that occur during operation.

Figure 13:
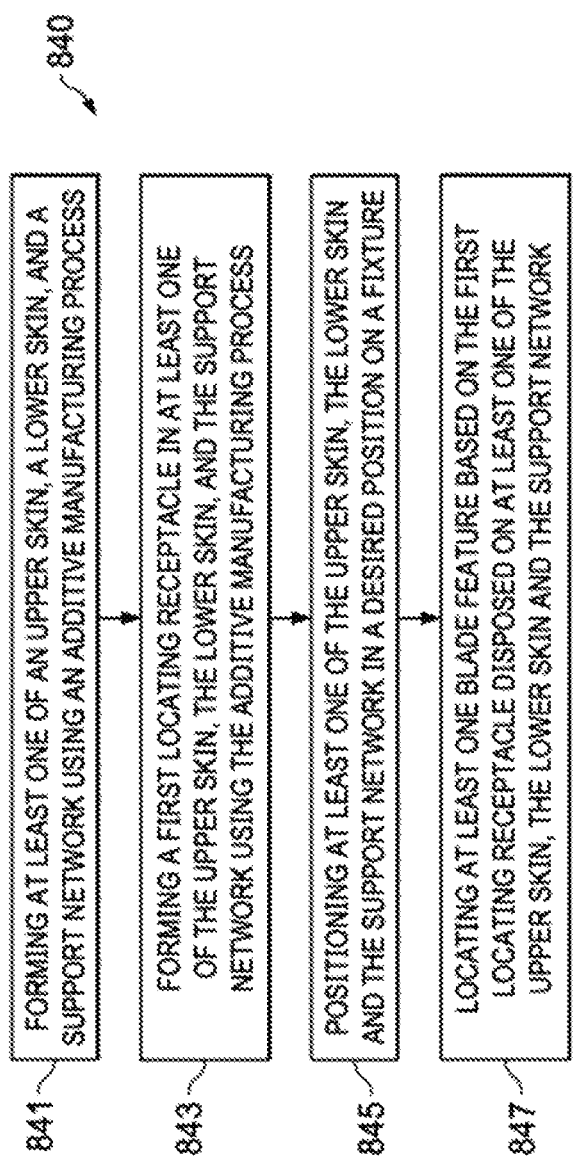
FIG. 13 is a flowchart illustrating a method of manufacturing a rotor blade, according to an illustrative embodiment.
Figure 14:
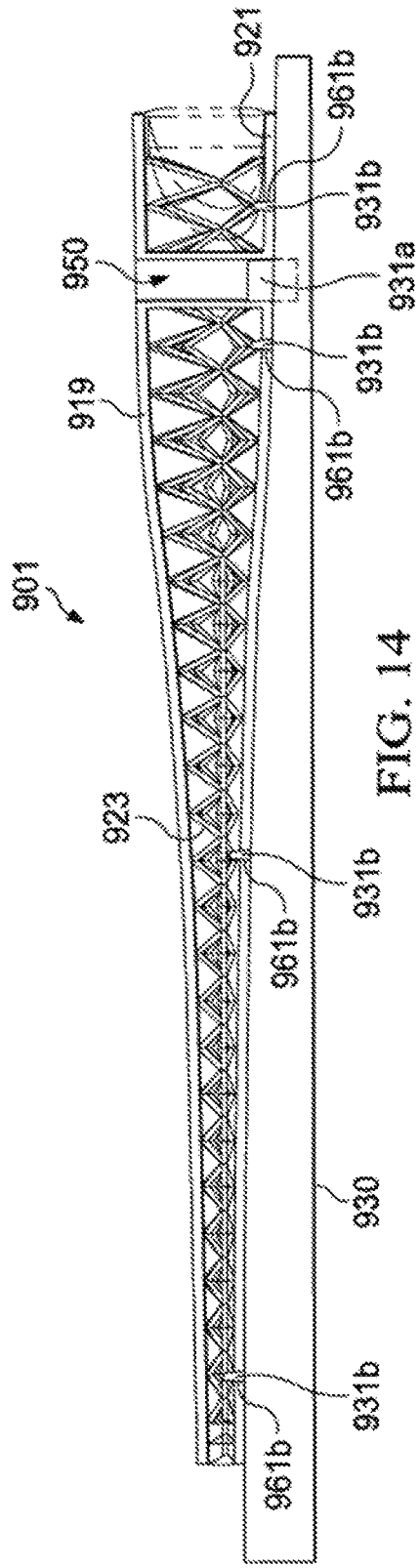
FIG. 14 is a schematic side view of assembly of a rotor blade in fixture according to an illustrative embodiment.

Referring now to FIGS. 13-14, in some embodiments method 840 is used to manufacturing a rotor blade including the step 841 of forming at least one of an upper skin 919, a lower skin 921, and a support network 923 using an additive manufacturing process; a step 843 of forming a first locating receptacle in at least one of the upper skin 919, the lower skin 921, and the support network 923 using the additive manufacturing process; and a step 845 of positioning at least one of the upper skin 919, the lower skin 921, and the support network 923 in a desired position on a fixture 930. The step 845 can include positioning in and/or on the fixture 930. Moreover, the step 845 of positioning is based, at least in part, on the first locating receptacle. In some embodiments, the method 840 further includes the step 847 of locating at least one blade feature (e.g., an aperture for a fastener) based on the first locating receptacle disposed on at least one of the upper skin 919, the lower skin 921, and the support network 923. The upper skin 919, lower skin 921, and support network 923 are as described above and further illustrated in an embodiment shown as rotor blade 901 in FIG. 14. The additive manufacturing process is as described herein.

The method includes forming a first locating receptacle, which in some embodiments can be the main bolt hole 550. In yet other embodiments, the first locating receptacle can be at least one receptacle in at least one of the upper skin, lower, skin, and the support network. In some embodiments, as shown in FIG. 14, the first locating receptacle can be a main bolt hole 950 alignable with a protrusion 931*a* in fixture 930. In other embodiments, the first locating receptacle can be a depression and/or inward receiving feature (such as a channel, aperture) that can receive a locating member. In an illustrative embodiment, the first locating feature can be a plurality of apertures 931*b* configured to receive a locating pin. The locating pin is alignable with at least one of the plurality of apertures 931*b*. In some embodiments, the first locating receptacle can be a protrusion in the upper skin 919, lower skin 921, and support network 923 alignable and received in a depression in the fixture 930.

The methods and apparatuses described herein can advantageously provide at least one of the following: reduced engineering time and costs, reduced manufacturing time and costs, and can reduce labor, tooling, reduce component weight, reduced manufacturing footprint and material costs for manufacturing a rotor blade.

Terms such as "first" and "second" are used only to differentiate features and not to limit the different features to a particular order or to a particular quantity.

At least one embodiment is disclosed and variations, combinations, and/or modifications of the embodiment(s) and/or features of the embodiment(s) made by a person having ordinary skill in the art is within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). For example, whenever a numerical range with a lower limit, $R_l$, and an upper, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 5 percent of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrow terms such as consisting of, consisting essentially of, and comprised substantially of. Accordingly, the scope of protection is not limited by the description set out above but is defined by the claims that follow, the scope including all equivalents of the subject matter of the claims. Each and every claim is incorporated as further disclosure into the specification and the claims are embodiment(s) of the present invention.

What is claimed is:

1. A method of forming a rotor blade, comprising:
    forming at least one of a partial upper skin, a partial lower skin, and a partial support network from a solidified layerwise base material using an additive manufacturing process; and
    forming a first receptacle in at least a one of the partial upper skin, the partial lower skin, and the partial support network from the solidified layerwise base material using the additive manufacturing process;
    disposing a weight and/or a plurality of weights in the first receptacle; and
    filling the first receptacle with a filler material that surrounds the weight and/or the plurality of weights, the filler material comprises a polymeric material dissimilar to the solidified layerwise base material.

2. The method according to claim 1, wherein the step of forming the first receptacle in at least one of the partial upper skin, the partial lower skin, and the partial support network using an additive manufacturing process comprises:
forming a first receptacle surface in at least one of the partial upper skin, the partial lower skin, and the partial support network.

3. The method according to claim 1, further comprising:
forming a second receptacle in at least one of the partial upper skin, the partial lower skin, and the partial support network using the additive manufacturing process;
wherein the second receptacle is configured to receive of at least one of a first electronic component and a first mechanical component.

4. The method according to claim 3, further comprising:
disposing at least one of the first electronic component and the first mechanical component in the second receptacle.

5. The method according to claim 4, further comprising:
filling at least a portion of the second receptacle with the filler material.

6. The method according to claim 4, further comprising:
filling all of the second receptacle with the filler material such that at least one of the first electronic component and the first mechanical component is embedded within the second receptacle.

7. The method according to claim 1, further comprising:
forming at least one of a full size upper skin, a full size lower skin, and a full size support networking using the additive manufacturing process.

8. The method according to claim 7, wherein the first receptacle is partially through at least one of the full size upper skin, the full size lower skin, and the full size support network.

9. The method according to claim 7, wherein the first receptacle extends through at least one of the full size upper skin, the full size lower skin, and the full size support network.

10. The method according to claim 7, wherein the first receptacle is disposed within at least one of the full size upper skin, the full size lower skin, and the full size support network.

11. The method according to claim 1, wherein the additive manufacturing process comprises at least one of the following: electron beam melting, selective laser sintering, selective laser melting, stereolithography, direct metal laser sintering, three-dimensional printing, fused deposition modeling, laser curing and lasered engineered net shaping.

12. The method according to claim 3, wherein the first electronic component comprises at least one of the following: an electric wire, a heater element, a light emitting device.

13. The method according to claim 3, wherein the first mechanical component comprises at least one of the following: a securing member, fastener, an abrasion strip, and an actuator.

* * * * *